UNITED STATES PATENT OFFICE.

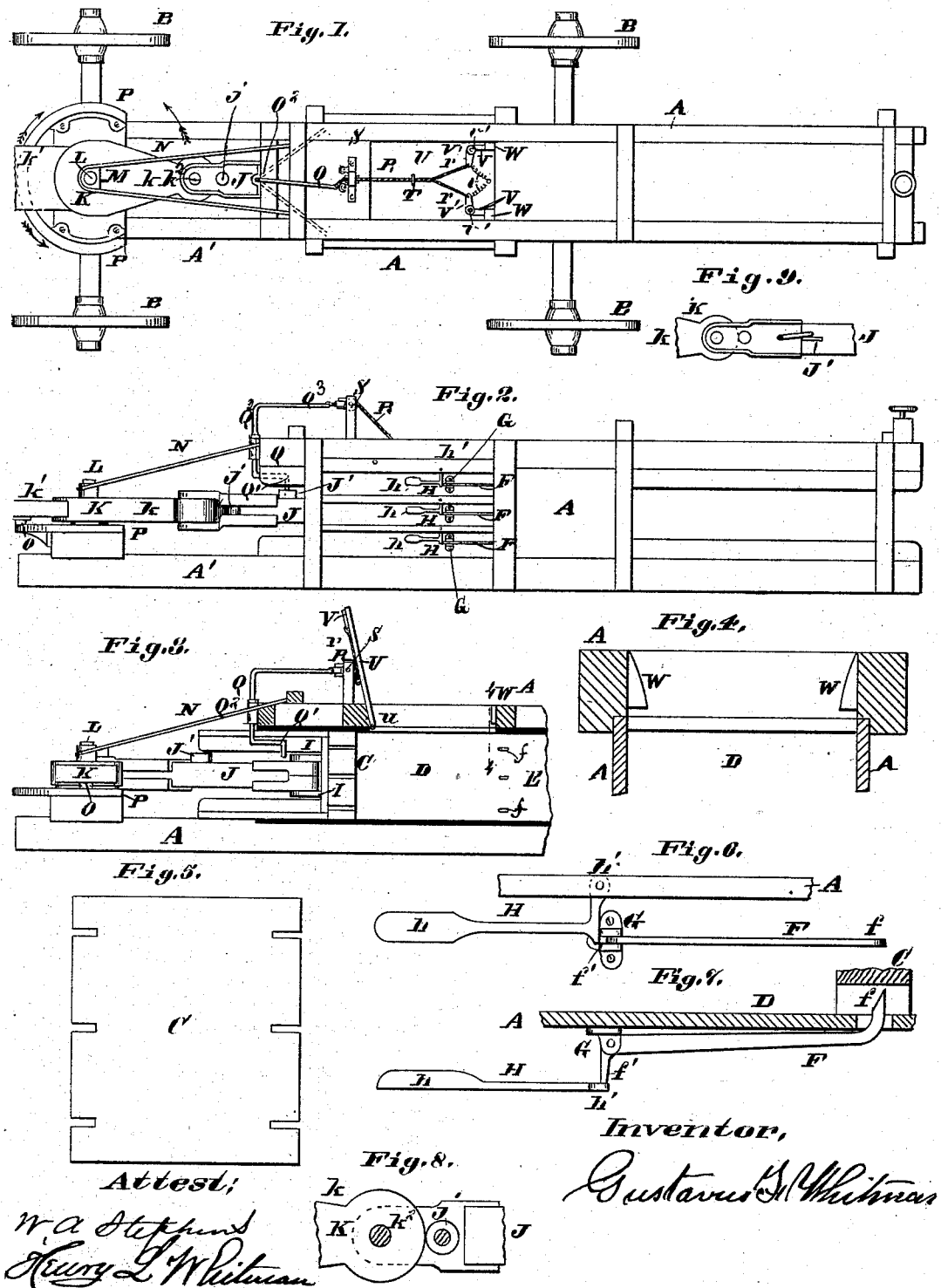

GUSTAVUS F. WHITMAN, OF ST. LOUIS, MISSOURI.

BALING-PRESS.

SPECIFICATION forming part of Letters Patent No. 274,871, dated March 27, 1883.

Application filed February 8, 1883. (No model.)

*To all whom it may concern:*

Be it known that I, GUSTAVUS F. WHITMAN, of the city of St. Louis, in the State of Missouri, have invented a certain new and useful Improvement in Baling-Presses, of which the following is a full, clear, and exact description, reference being had to the accompanying drawings, forming part of this specification.

My invention relates to improvements in the class of baling-presses known as "continuous or perpetual," in which the material to be compressed is fed into one end of the press-box and the finished bale ejected from the opposite end.

My improvement consists in a door that closes either automatically or otherwise the top of the pressure-chamber when the hay or other substance is being compressed.

My invention also consists in the details of construction of the door and machinery for moving the same, and to other details set forth in the claims.

Figure 1 is a top view of the press with the hopper removed. Fig. 2 is a side view of the press-box with hopper removed. Fig. 3 is a part elevation and part vertical section of the front portion of the press. Fig. 4 is an enlarged transverse detail section at 4 4, Fig. 3. Fig. 5 is an enlarged front view of the traverser. Fig. 6 is an enlarged side view of a retainer. Fig. 7 is an enlarged detail horizontal section, showing one of the retainers and its actuating weighted lever. Fig. 8 is an enlarged detail, showing a top view of the bearing of the sweep upon the toggle-arm. Fig. 9 is a detail top view, showing the cam upon the toggle-arm in connection with the arm of the lever by means of which the door is thrown up to open the pressure-chamber.

In Fig. 1 the press-box A is shown mounted upon wheels B for removal from place to place; but my invention is equally applicable to stationary presses.

C is the traverser by which the material is compressed in the pressure-chamber D and forced into the receiving-chamber E. On the backward movement of the traverser the hay or other material is prevented from following the traverser in its retrograde movement by automatic retainers F, whose points $f$ project through the sides of the box into the chamber E, being beveled, as shown, so that the hay in its forward movement will force them outward. When the hay ceases to move forward, the retainers move forward for the purpose stated. To allow this movement of the retainers they are hinged to brackets G at the outer side of the press-box. The retainers have arms $f'$ projecting outward from the hinges, against which bear the weighted angle-levers H, so as to press the retainers inward at their free ends $f$. $h$ are weighted horizontal arms of the levers H, rendering them effective for the purpose stated, the levers being fulcrumed above at $h'$. The traverser is shown at C. It is attached to lugs I, to which is connected the toggle-arm J by means of a hinge-joint, that allows the needed oscillatory movements of the arm. The free end of the toggle-arm is hinged to the short arm $k$ of the sweep K, to whose long arm $k'$ the horse is attached. The short arm $k$ ends in a curved bearing-surface that works against an anti-friction roller, $j$, of the toggle-arm, so as to relieve the pin $k^2$ of part of the strain that would otherwise come upon it. The sweep K turns on a pin, L, having bearing below in the frame A', and having bearing above in a block, M, connected to the press-box by a stay, N.

O is an anti-friction wheel connected to the sweep and running upon a track or rail, P, beneath. This wheel gives support to the long arm of the sweep.

Upon the toggle-arm J is a cam, J', that acts against the arm Q' of a lever, Q, that oscillates upon a rock-shaft, Q², having bearing at the end of the press-box. Q³ is an arm of the lever, to whose free end is attached a cord or chain, R, passing through a bearing at S. Bearing-pulleys should be provided at the point of bearing to lessen the wear of the cord or chain R. From the point S the cord passes to an eye, T, upon the door U, (the cord passing through said eye.) The door is hinged to the press-box at $u$. V V are spring-catches near the free end of the door, the said catches being thrown outward by springs $v$, to engage beneath fixed catches W at the sides of the feed-opening of the press-box. As illustrated in the drawings, the spring-catches V turn on a pivot, $v'$, and have arms V', to which the springs are attached at one end, the other ends of the springs being made fast to the press-box. The cord or chain R divides into two branches, r, which are made fast to the arms V'.

The operation of my improvement is as follows: When the sweep is in the position shown in Figs. 1 and 2 of the drawings, the traverser is in its most advanced position. When the sweep commences to swing around, the cam J' acts on the lever Q' by means of intermediate mechanism, as described, to draw back the cord R. The first action of the cord is to throw out the catches V from beneath the fixed catches W. The cord then draws the door upward into the position shown in Fig. 3, opening the pressure-chamber for the introduction of a charge of hay, the traverser having been simultaneously drawn back from said chamber. As the door reaches its open position (see Fig. 3) the movement of the toggle-arm carries the cam J' out of contact with the downturned end of the arm Q, and the sweep continues to move until the traverser has reached its backward position. (See Fig. 3.) A charge of hay is then fed into the pressure-chamber D. The door U is then thrown shut by hand, the catches engaging automatically and holding the door shut while the hay is under pressure and until the traverser begins to move backward.

In place of the arm $Q^3$, a wheel or sector may be used, which is grooved at the periphery to receive the cord or chain R, which is thus operated by the oscillation of the wheel or sector. A crank disk or wheel may be used in place of the arm Q'.

I claim—

1. In a continuous baling-press, a door, U, connected to the sweep by means shown, and opened by the movement of the sweep, substantially as set forth.

2. The combination, in a continuous baling-press, of a sweep, a traverser, and a door, connected together by means substantially as and for the purpose set forth.

3. The combination of sweep K, arm J, cam J', lever Q, cord R, and catches V, for the purpose set forth.

4. The combination, in a continuous baling-press, of the hinged retainers F and weighted levers H, substantially as and for the purpose set forth.

GUSTAVUS F. WHITMAN.

Witnesses:
  CORA L. WHITMAN,
  W. A. STEPHENS.